United States Patent
Kubota et al.

(10) Patent No.: US 12,320,408 B2
(45) Date of Patent: Jun. 3, 2025

(54) ROTARY FEEDTHROUGH AND ROBOT

(71) Applicant: Nabtesco Corporation, Tokyo (JP)

(72) Inventors: Koji Kubota, Tokyo (JP); Tatsuya Yokoyama, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 1 day.

(21) Appl. No.: 18/322,192

(22) Filed: May 23, 2023

(65) Prior Publication Data
US 2023/0383817 A1   Nov. 30, 2023

(30) Foreign Application Priority Data

May 25, 2022  (JP) .................................. 2022-085060

(51) Int. Cl.
*F16H 1/32* (2006.01)
*B25J 9/10* (2006.01)

(52) U.S. Cl.
CPC ................ *F16H 1/32* (2013.01); *B25J 9/102* (2013.01)

(58) Field of Classification Search
CPC . F16H 1/32; F16H 19/005; B25J 9/102; B25J 18/00
See application file for complete search history.

(56) References Cited

U.S. PATENT DOCUMENTS

| | | | | |
|---|---|---|---|---|
| 4,609,841 A * | 9/1986 | Masaki | .................... | F16H 35/00 310/83 |
| 4,635,502 A * | 1/1987 | George | .................... | B25B 21/00 74/625 |
| 5,473,961 A * | 12/1995 | Jackson | ................ | B05B 3/0431 116/307 |
| 5,771,753 A * | 6/1998 | Kwon | ...................... | B25J 9/101 74/526 |
| 8,757,345 B2 * | 6/2014 | Blank | ............... | H01L 21/67742 192/139 |
| 8,763,488 B2 * | 7/2014 | Reekers | ................... | B25J 9/101 403/116 |

(Continued)

FOREIGN PATENT DOCUMENTS

| CN | 102574284 A | 7/2012 |
|---|---|---|
| DE | 29616401 U1 | 10/1997 |

(Continued)

OTHER PUBLICATIONS

Extended European Search Report dated Oct. 18, 2023, issued in corresponding European Patent Application No. 23174292.5 (9 pgs.).

*Primary Examiner* — Ha Dinh Ho
(74) *Attorney, Agent, or Firm* — Pillsbury Winthrop Shaw Pittman, LLP (57) ABSTRACT

A rotary feedthrough according to the disclosure includes: a seal partition wall dividing a space into a first space and a second space; a rotating member positioned to extend through the seal partition wall and configured to transmit a rotational driving force; a rotation input unit positioned in the first space and configured to input a driving force to the rotating member; and a rotation restraining unit positioned in the second space and configured to restrain rotation of the rotating member. The rotation restraining unit restrains rotation of the rotating member about a rotation axis exceeding a predetermined rotation angle.

9 Claims, 9 Drawing Sheets

(56) References Cited

U.S. PATENT DOCUMENTS

| | | | |
|---|---|---|---|
| 9,803,732 B2* | 10/2017 | Rinke | A63J 19/006 |
| 2010/0178146 A1* | 7/2010 | Kremerman | B25J 18/00 |
| | | | 74/490.06 |
| 2014/0033853 A1 | 2/2014 | Kitahara et al. | |
| 2018/0079090 A1* | 3/2018 | Koenig | G01L 3/14 |
| 2020/0189126 A1 | 6/2020 | Igarashi et al. | |

FOREIGN PATENT DOCUMENTS

| | | |
|---|---|---|
| EP | 2479009 A1 | 7/2012 |
| JP | 2-186151 A | 7/1990 |
| WO | 2012/147558 A1 | 11/2012 |
| WO | 2022/091550 A1 | 5/2022 |

\* cited by examiner

ROTARY FEEDTHROUGH AND ROBOT

CROSS-REFERENCE TO RELATED APPLICATIONS

This application is based on and claims the benefit of priority from Japanese Patent Application Serial No. 2022-085060 (filed on May 25, 2022), the contents of which are hereby incorporated by reference in their entirety.

TECHNICAL FIELD

The present disclosure relates to a rotary feedthrough and a robot.

BACKGROUND

In the manufacture of flat panel displays (FPDs) such as liquid crystal displays and organic EL displays, or in the manufacture of semiconductor devices, substrates are moved to the processing section of the manufacturing apparatus in a vacuum such as a vacuum chamber for processing. A rotary feedthrough, which is known to be used in this operation, introduces a rotational driving force into the vacuum chamber from a rotational drive source located outside the vacuum chamber (see, for example, Japanese Patent Application Publication No. H 02-186151).

With such a rotary feedthrough, sealing has to be maintained on both sides of the partition wall of the vacuum chamber to maintain the vacuum in the vacuum chamber, and the rotational driving force has to be transmitted from the outside to the inside of the vacuum chamber.

For example, for transfer robots that rotate and transfer substrates in a transfer chamber, there is a demand for downsizing the entire manufacturing apparatus, including the transfer robot. In particular, in the manufacture of FPDs, for example, it is desirable to reduce the overall height of the manufacturing apparatus and maintain the height of the building that houses the manufacturing apparatus at a low level. Therefore, there is a demand for downsizing the manufacturing apparatus in the vertical direction, i.e., in the rotational axis direction. At the same time, there is also a demand for downsizing the manufacturing apparatus in the radial direction.

SUMMARY

One object of the present disclosure is to provide a rotary feedthrough and a robot capable of downsizing.

(1) A rotary feedthrough according to an aspect of the disclosure includes: a partition wall dividing a space into a first space and a second space; a rotating member positioned to extend through the partition wall and configured to transmit a rotational driving force; a rotation input unit positioned in the first space and configured to input a driving force to the rotating member; and a rotation restraining unit positioned in the second space and configured to restrain rotation of the rotating member. The rotation restraining unit restrains rotation of the rotating member about a rotation axis exceeding a predetermined rotation angle.

According to the above configuration, a rotational driving force can be transmitted using the rotating member extending through the partition wall (seal partition wall) that divides the space into a vacuum side (second space) and an atmospheric side (first space), for example. In particular, even in the case of loss of the driving force, the rotation restraining unit can be used to restrain the rotation of the rotating member exceeding a preset range (exceeding a predetermined rotation angle). Moreover, the rotation restraining unit is positioned on the opposite side to the drive side (rotation input unit), i.e., on the vacuum side (second space) with respect to the seal partition wall. Therefore, the length of the rotary feedthrough in the direction along the rotation axis, i.e., the overall height of the apparatus, can be reduced.

(2) In the rotary feedthrough of (1), it is also possible that the rotation restraining unit includes: a restraining portion provided on the rotating member and configured to rotate about the rotation axis together with the rotating member; and a fixed portion fixed to the partition wall and configured to be contacted by the restraining portion from a circumferential direction around the rotation axis.

(3) In the rotary feedthrough of (1), it is also possible that a rotation diameter of the rotating member is smaller than an outer diameter of the rotation input unit, as viewed from a direction along the rotation axis.

(4) In the rotary feedthrough of (1), it is also possible that the rotation restraining unit includes: a restraining portion provided on the rotating member and configured to rotate about the rotation axis together with the rotating member; and a fixed portion fixed to the partition wall and configured to be contacted by the restraining portion from a circumferential direction around the rotation axis. The restraining portion has a first restraining surface. The fixed portion has a second restraining surface configured to be contacted by the first restraining surface from the circumferential direction in order to restrain rotation of the rotating member.

(5) In the rotary feedthrough of (4), it is also possible that one of the first and second restraining surfaces is a convex rounded surface protruding toward another of the first and second restraining surfaces. It is also possible that the other of the first and second restraining surfaces is a concave rounded surface conforming to the convex rounded surface.

(6) In the rotary feedthrough of (5), it is also possible that a first member is defined as one of the restraining portion and the fixed portion having the other of the first and second restraining surfaces that is the concave rounded surface, and a second member is defined as another of the restraining portion and the fixed portion having the one of the first and second restraining surfaces that is the convex rounded surface, and a circumferential width of the first member is larger than that of the second member.

(7) In the rotary feedthrough of (1), it is also possible that the rotation restraining unit includes: a restraining portion provided on the rotating member and configured to rotate about the rotation axis together with the rotating member; and a fixed portion fixed to the partition wall and configured to be contacted by the restraining portion from a circumferential direction around the rotation axis. The restraining portion and the fixed portion are formed of a tempered material that has been heat treated.

(8) In the rotary feedthrough of (1), it is also possible that the rotation restraining unit includes: a restraining portion provided on the rotating member and configured to rotate about the rotation axis together with the rotating member; and a fixed portion fixed to the partition wall and configured to be contacted by the restraining portion from a circumferential direction around the rotation axis. The restraining portion is detachably attached to the rotating member.

(9) In the rotary feedthrough of (1), it is also possible that the partition wall has provided thereon a seal mechanism that extends between the rotating member and the partition wall to divide the space into the first space and the second space.

(10) In the rotary feedthrough of (9), it is also possible that the seal mechanism is positioned between the rotation restraining unit and the rotation input unit in a direction along the rotation axis.

(11) A rotary feedthrough according to another aspect of the disclosure includes: a partition wall dividing a space into a first space and a second space; a rotating member positioned to extend through the partition wall and configured to transmit a rotational driving force; a rotation input unit positioned in the first space and configured to input a driving force to the rotating member; and a rotation restraining unit positioned in the second space and configured to restrain rotation of the rotating member. The rotation restraining unit restrains rotation of the rotating member about a rotation axis exceeding a predetermined rotation angle. The rotation input unit includes: a case; an internal gear provided in the case and having internal teeth; an oscillating gear having external teeth meshing with the internal teeth, the oscillating gear being configured to oscillatorily rotate; a crankshaft having an eccentric portion that rotatably supports the oscillating gear and configured to transmit a rotational force of a drive source to the oscillating gear; and a carrier configured to receive the rotational force from the oscillating gear and output the rotational force as the driving force to the rotating member.

According to the above configuration, a rotational driving force can be transmitted via an oscillation transmission using the rotating member extending through the partition wall (seal partition wall) that divides the space into a vacuum side (second space) and an atmospheric side (first space), for example. In particular, even in the case of loss of the driving force, the rotation restraining unit can be used to restrain the rotation of the rotating member exceeding a preset range (exceeding a predetermined rotation angle). Moreover, the rotation restraining unit is positioned on the opposite side to the drive side (rotation input unit), i.e., on the vacuum side (second space) with respect to the seal partition wall. Therefore, the length of the rotary feedthrough in the direction along the rotation axis, i.e., the overall height of the apparatus, can be reduced.

(12) A robot according to another aspect of the disclosure includes: a partition wall dividing a space into a first space and a second space, the first space being maintained at an atmospheric pressure, the second space being maintained in a vacuum; a rotating member positioned to extend through the partition wall and configured to transmit a rotational driving force; a rotation input unit positioned in the first space and configured to input a driving force to the rotating member; and a rotation restraining unit positioned in the second space and configured to restrain rotation of the rotating member. The rotation restraining unit restrains rotation of the rotating member about a rotation axis exceeding a predetermined rotation angle. The rotation input unit is positioned in the first space and configured to output to the rotating member a rotational force generated by a drive source as the driving force. The rotating member transmits the rotational driving force to the second space.

According to the above configuration, a rotational driving force can be transmitted using the rotating member extending through the partition wall (seal partition wall) that divides the space into a vacuum side (second space) and an atmospheric side (first space), for example. In particular, even in the case of loss of the driving force, the rotation restraining unit can be used to restrain the rotation of the rotating member exceeding a preset range (exceeding a predetermined rotation angle). Moreover, the rotation restraining unit is positioned on the opposite side to the drive side (rotation input unit), i.e., on the vacuum side (second space) with respect to the seal partition wall. Therefore, the length of the robot in the direction along the rotation axis, i.e., the overall height of the robot, can be reduced.

(13) In the robot of (12), it is also possible that the second space is a vacuum space in a transfer chamber included in a vacuum processing apparatus.

The present disclosure makes it possible to downsize a rotary feedthrough.

DESCRIPTION OF THE PREFERRED EMBODIMENTS

First Embodiment

Figure 1:
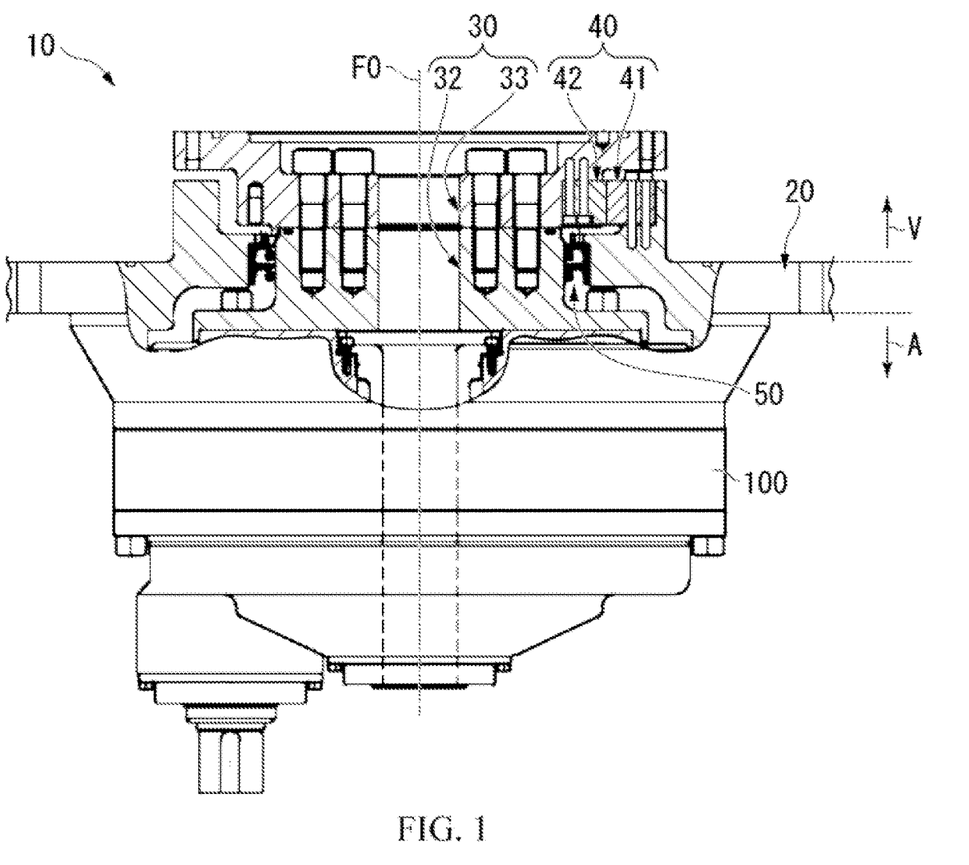
FIG. 1 is a (partially sectional) side view showing a first embodiment of a rotary feedthrough according to the present disclosure.
Figure 2:
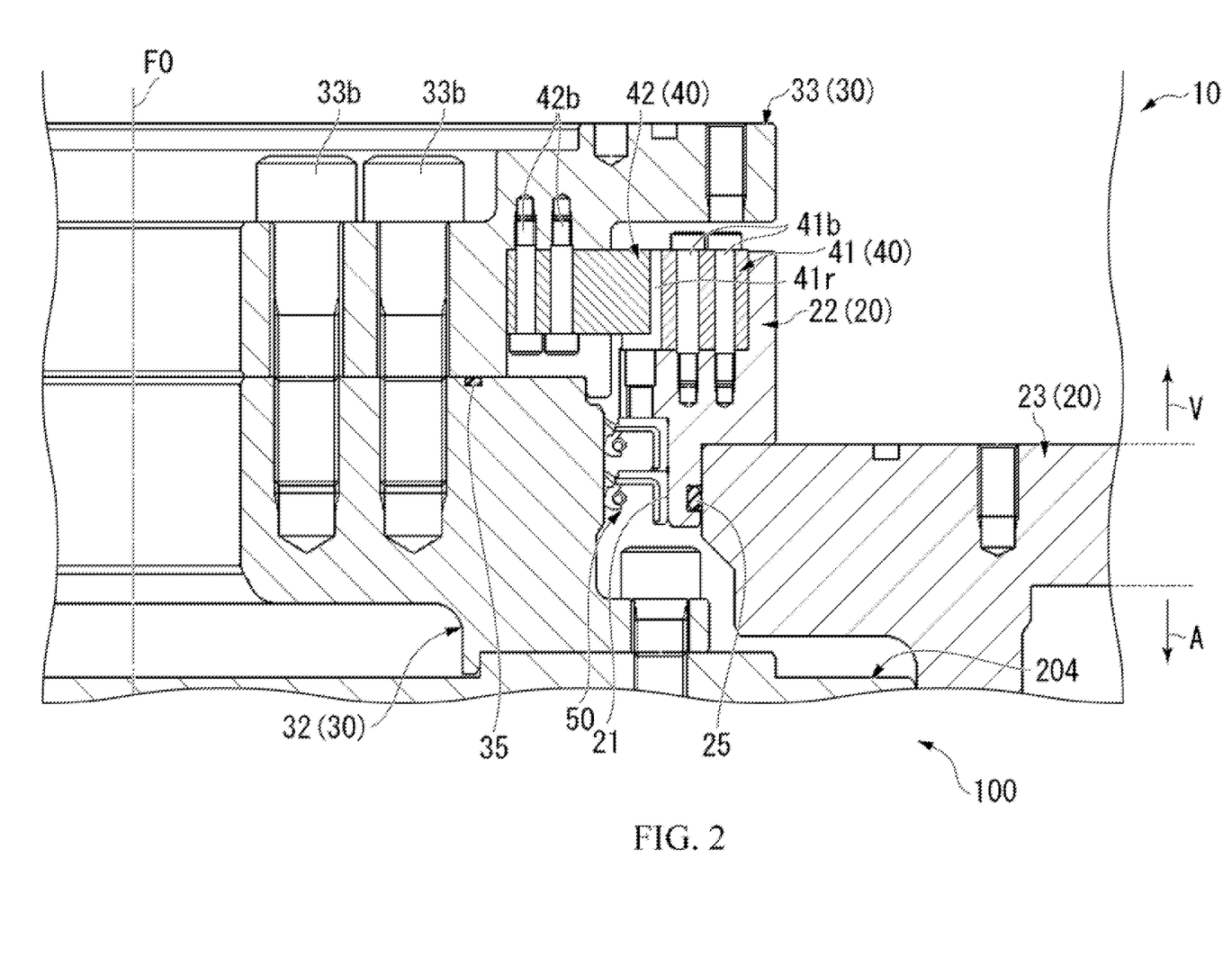
FIG. 2 is an enlarged sectional view of a rotation restraining unit and its periphery shown in FIG. 1.

A first embodiment of the rotary feedthrough according to the disclosure will be hereinafter described with reference to the accompanying drawings. FIG. 1 is a (partially sectional) side view showing the rotary feedthrough according to the present invention. FIG. 2 is an enlarged sectional view of a part of the rotary feedthrough shown in FIG. 1. In these figures, the reference numeral 10 denotes the rotary feedthrough.

As shown in FIGS. 1 and 2, the rotary feedthrough 10 according to this embodiment includes a seal partition wall (partition wall) 20, a rotating member 30, a rotation restraining unit (mechanical stopper) 40, a seal mechanism 50, and a rotation input unit (speed reducer) 100. In this embodiment, the direction along the rotation axis F0 of the rotating member 30 is referred to as the vertical direction. Furthermore, the directions intersecting the rotation axis F0 in plan view along the rotation axis F0 are referred to as the radial directions, and the direction circling around the rotation axis F0 is referred to as the circumferential direction. Furthermore, of the radial directions, the direction away from the rotation axis F0 is referred to as the radially outward direction, and the direction opposite thereto is referred to as the radially inward direction.

The seal partition wall 20 serves to partition (divide) the space vertically, as shown in FIGS. 1 and 2. Specifically, the seal partition wall 20 divides the space into a first space A, located below the seal partition wall 20, and a second space V, located above the seal partition wall 20. The first space A is, for example, a space maintained at the atmospheric pressure. The second space V is, for example, a space maintained at a vacuum atmosphere or a reduced pressure compared to the first space A. The seal partition wall 20 serves as a seal between the first space A and the second space V so that gases and other substances do not move between the first space A and the second space V. Although not shown in FIGS. 1 and 2, the seal partition wall 20 extends radially outward, for example. The rotation input unit 100 is located in the first space A below the seal partition wall 20.

As shown in FIG. 2, the seal partition wall 20 has a through hole 21 formed therein. The seal partition wall 20 includes a through member 22 having the through hole 21, and a wall portion 23 that vertically divides the first space A from the second space V. The through member 22 and the wall portion 23 are assembled together as a single unit. A seal member 25, such as an O-ring, is placed between the through member 22 and the wall portion 23. The seal member 25 provides proper sealing between the through member 22 and the wall portion 23.

As shown in FIGS. 1 and 2, the rotating member 30 extends through the through hole 21. The rotating member 30 is formed around the rotation axis F0 and is driven rotationally by the rotation input unit 100. The rotating member 30 is connected to the rotation input unit 100 in the first space A. The rotation axis F0 of the rotating member 30 and the rotation axis F0 of a carrier 204 of the rotation input unit 100 described later are coaxial with each other.

As shown in FIG. 2, the rotating member 30 includes a connection member 32 connected to the rotation input unit 100, and a rotating end portion 33 located in the second space V and connected to the connection member 32. The connection member 32 and the rotating end portion 33 are arranged to overlap in the vertical direction and are fastened to each other by bolts 33*b* placed parallel to the rotation axis F0. A seal member 35, such as an O-ring, is placed between the connection member 32 and the rotating end portion 33. The seal member 35 provides proper sealing between the connection member 33 and the rotating end portion 33.

In this embodiment, the rotation input unit 100 serves as a speed reducer. The connection member 32 is connected to a carrier 204 of the rotation input unit 100. The wall portion 23 of the seal partition wall 20 is formed integrally with a case (outer tube) 300 (described later) of the rotation input unit 100.

The seal mechanism 50 is placed between the connection member 32 housed in the through hole 21 and the through hole 21. The seal mechanism 50 in the through hole 21 provides sealing between the first space A and the second space V. The seal mechanism 50 will be described later.

In the region located on the second space V side of the seal mechanism 50 in the direction along the rotation axis F0, the outer circumference of the rotating end portion 33 and the inner circumference of the through member 22 are opposed to each other in the radial direction. The rotation restraining unit 40 is located in this region. The rotation restraining unit 40 is positioned between the outer circumference of the rotating end portion 33 and the inner circumference of the through member 22.

Figure 3:
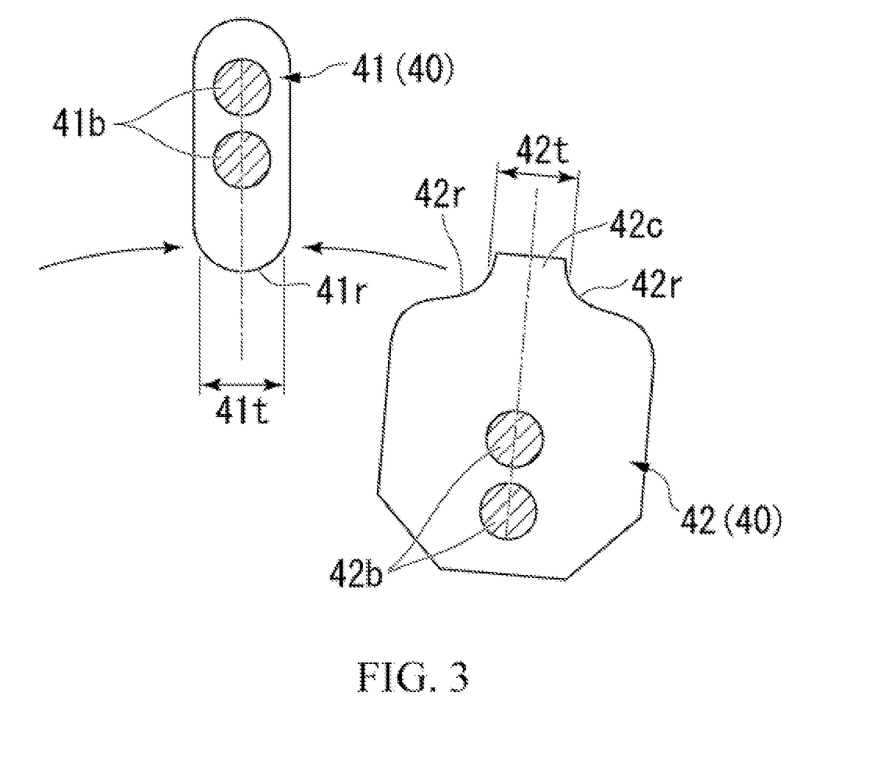
FIG. 3 is a plan view of the rotation restraining unit shown in FIG. 2.
Figure 4:
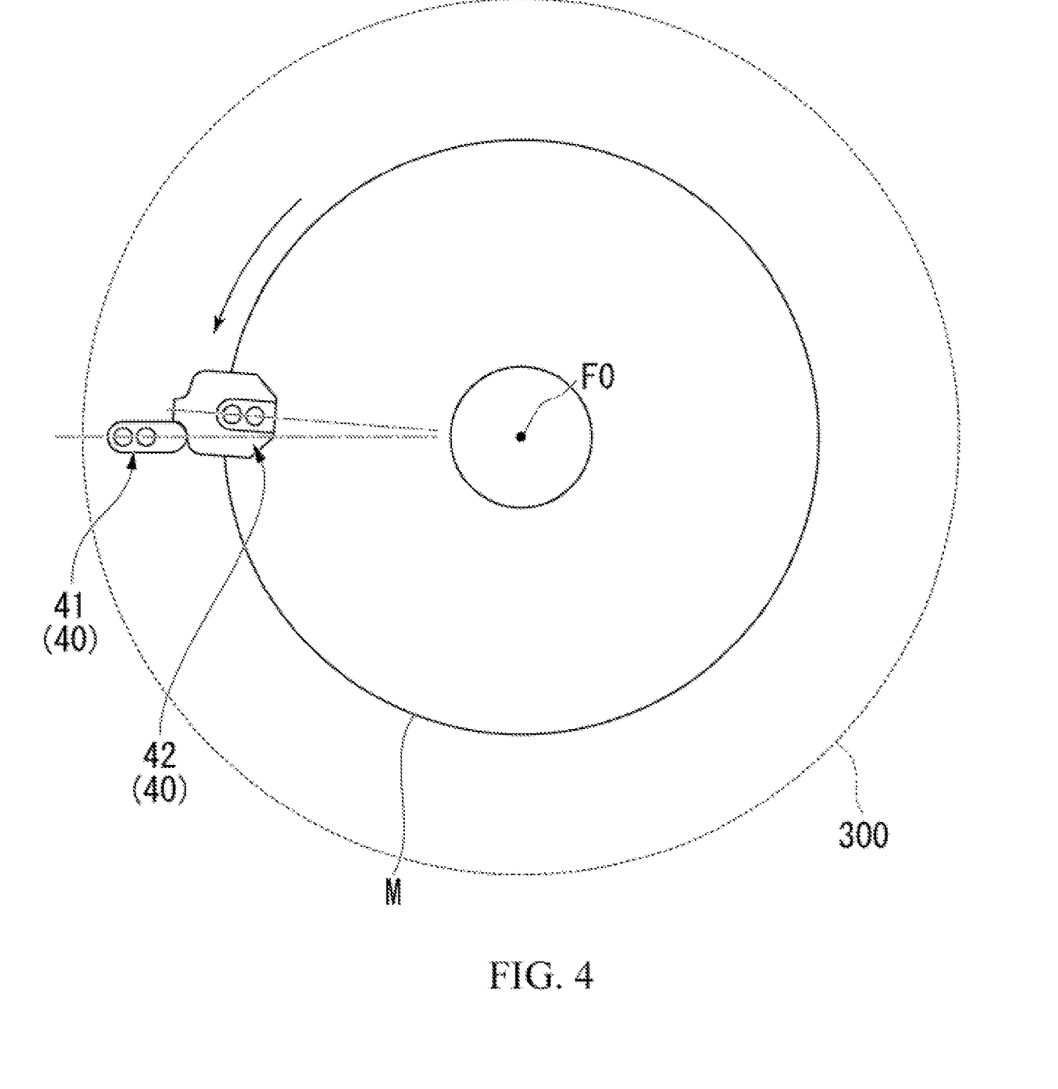
FIG. 4 is a schematic view showing movement of the rotation restraining unit shown in FIG. 3.

FIG. 3 is an enlarged view of the rotation restraining unit 40 viewed from the direction along the rotation axis F0. FIG. 4 is a schematic diagram of the operation of the rotation restraining unit 40 viewed from the direction along the rotation axis F0. As shown in FIGS. 2 to 4, the rotation restraining unit 40 includes a restraining portion 42 and a fixed portion 41. The restraining portion 42 is assembled to the outer circumference of the rotating end portion 33, and the fixed portion 41 is fixed to the inner circumference of the through member 22 and configured to contact with the restraining portion 42 from the circumferential direction around the rotation axis F0. The rotation restraining unit 40 restrains the rotation of the rotating member 30 when the restraining portion 42 and the fixed portion 41 contact with each other in the circumferential direction.

The rotation restraining unit 40 is located in the second space V. In other words, the rotation restraining unit 40 is exposed in the second space V. In FIGS. 1 and 2, the restraining portion 42 and the fixed portion 41 are in contact with each other in the circumferential direction. Furthermore, FIG. 2 is based on the positional relationship between the restraining portion 42 and the fixed portion 41 shown in FIG. 4.

As shown in FIG. 3, the fixed portion 41 has a restraining surface (second restraining surface) 41*r*. The restraining portion 42 has restraining surfaces 42*r* (first restraining surfaces). The restraining surface 41*r* and the restraining surfaces 42*r* contact with each other to restrain rotation of the rotating member 30. The restraining surface 41*r* of the fixed portion 41 is a convex rounded surface protruding outward in the radial direction. The restraining surfaces 42*r* of the restraining portion 42 are concave rounded surfaces formed to conform to the shape of the restraining surface 41*r*. The restraining surface 41*r* and the restraining surfaces 42*r* are shaped like an arc with the same curvature. Both the restraining surface 41*r* and the restraining surfaces 42*r* are formed to protrude in the radial direction beyond the inner circumferential surface (circular outline) of the through hole 21 as viewed from the direction along the rotation axis F0. Specifically, the restraining surfaces 42*r* of the restraining portion 42 protrude radially outward beyond the inner circumferential surface of the through hole 21, and the restraining surface 41*r* of the fixed portion 41 protrudes radially inward beyond the inner circumferential surface of the through hole 21.

The fixed portion 41 has an oval outline as viewed from the direction along the rotation axis F0. The fixed portion 41 extends along the radial direction and has a substantially uniform thickness along the rotation axis F0. The restraining surface 41*r* is formed at radially opposite sides of the fixed portion 41 and has a semicircular convex shape. The restraining portion 42 has a larger width in the circumferential direction than the fixed portion 41 and has a substantially uniform thickness along the rotation axis F0. The restraining surfaces 42*r* are format at an interval in the circumferential direction and face in opposite circumferential directions. This makes it possible to stop the rotation of the restraining portion 42 by contact between the restraining surface 41*r* and the restraining surfaces 42*r* when the restraining portion 42 rotates either forward or backward around the rotation axis F0.

As shown in FIGS. 2 and 3, the fixed portion 41 is fastened and fixed to the inner circumference of the through member 22 with bolts 41*b* positioned parallel to the rotation axis F0. The restraining portion 42 is fastened and fixed to the outer circumference of the rotating end portion 33 with bolts 42*b* positioned parallel to the rotation axis F0. Therefore, it is possible to easily remove the restraining portion 42 and the fixed portion 41 by removing the bolts 41*b* and 42*b*. Therefore, when the restraining portion 42 and the fixed portion 41 collide with each other and are deformed, either of them that needs to be replaced can be promptly replaced.

In this embodiment, the restraining portion 42 is detachable from the rotating end portion 33, and the fixed portion 41 is detachable from the through member 22, but this configuration is not limitative. For example, the restraining portion 42 and the rotating end portion 33 may be formed as one piece, or the fixed portion 41 and the through member 22 may be formed as one piece.

The fixed portion 41 of the rotation restraining unit 40 is positioned radially inside the outline of the case 300 of the rotation input unit 100, as viewed from the direction along the rotational axis F0. Therefore, as shown in FIG. 4, the restraining portion 42 of the rotation restraining unit 40 is positioned such that the radial dimension (diameter) of its rotation locus M is smaller than the outer dimension (outer diameter) of the case 300 of the rotation input unit 100. In other words, as viewed from the direction along the rotation axis F0, the radius of rotation of the restraining portion 42 of the rotation restraining unit 40 around the rotation axis F0 is smaller than the radius of rotation of the rotation input unit 100.

As shown in FIG. 3, the relationship between the sizes of the restraining portion 42 and the fixed portion 41 is defined such that, as described earlier, the circumferential width of the restraining portion 42 is larger than that of the fixed portion 41 as viewed from the direction along the rotation axis F0. Furthermore, the portion of the restraining portion 42 located between the restraining surfaces 42*r* that face in the circumferential direction forms a protrusion 42*c* that protrudes radially outward beyond the restraining surfaces 42*r*. The circumferential width 42*t* of the protrusion 42*c* is about the same as the circumferential width 41*t* of the fixed portion 41.

Both the restraining portion 42 and the fixed portion 41, which are exposed to vacuum, are preferably formed of a tempered material that has been heat treated for surface treatment, for example. Furthermore, the restraining portion 42 and the fixed portion 41 may be formed of a material having a higher mechanical strength than that of the rotating member 30 or the seal partition wall 20, or they may be formed of stainless steel or the like.

Figure 5:
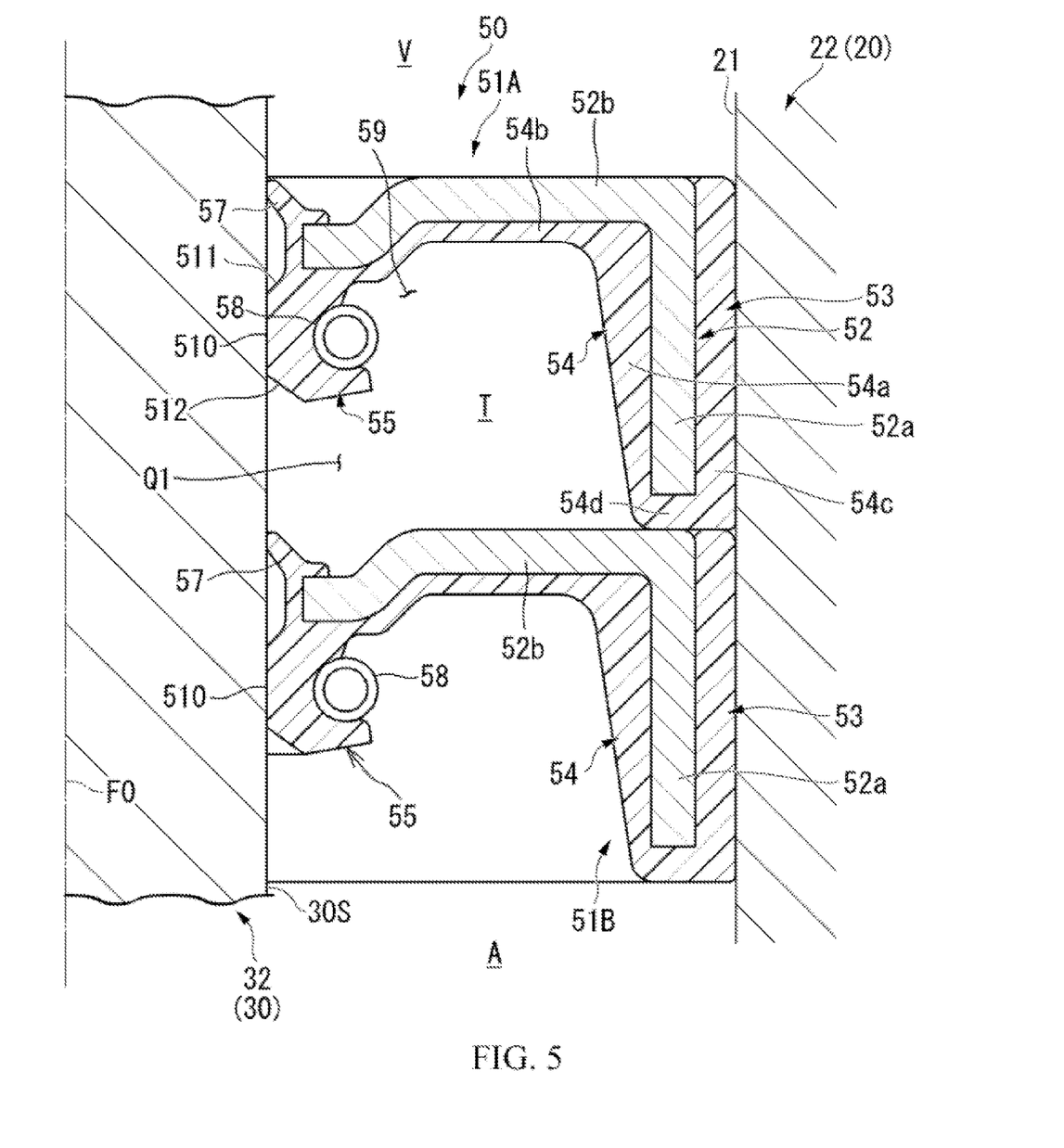
FIG. 5 is an enlarged sectional view of the seal mechanism and its periphery shown in FIG. 2.

FIG. 5 is a schematic view of the seal mechanism 50 according to the embodiment. The seal mechanism 50 serves to partition an annular space T formed between the connection member 32 of the rotating member 30 and the through hole 21 of the seal partition wall 20 in a sealed condition into the first space A and the second space V in the vertical direction along the rotation axis F0. In this embodiment, the seal mechanism 50 includes two sealing devices to enhance the sealing performance. Specifically, the seal mechanism 50 includes a sealing device 51A and a sealing device 51B.

The sealing devices 51A and 51B are arranged adjacent to each other in the vertical direction. The sealing device 51A is positioned closer to the second space V than the sealing device 51B. The sealing device 51A and the sealing device 51B have substantially the same configuration. Therefore, the sealing device 51A will be described in detail, whereas the sealing device 51B will not be described in detail. In this embodiment, the portions of the sealing device 51B corresponding to those of the sealing device 51A will be denoted by the same reference signs.

As shown in FIG. 2, the rotating member 30 serves as a shaft for transmitting rotation to provide a rotational force to an instrument (not shown) installed in the vacuum chamber. The seal partition wall 20 is arranged such that the inside and outside of the vacuum chamber communicate with each other. The rotating member 30 is inserted through the through hole 21 formed in the seal partition wall 20 from the second space (vacuum space) V, which is located inside the vacuum chamber, to the first space (atmospheric space) A, which is outside the vacuum chamber.

As shown in FIG. 5, the sealing device 51A includes a core 52 made of metal, and a seal member 53 made of rubber or other elastic material adhered to the core 52 by vulcanization adhesion. The core 52 has an annular shape formed by pressing or otherwise processing a steel plate such as SPCC, for example. The core 52 includes a first cylindrical portion 52*a* and a first annular portion 52*b*. The first cylindrical portion 52*a* has a cylindrical shape and is disposed radially inside the inner circumferential surface of the through hole 21, and the first annular portion 52*b* extends radially inward from the upper end of the first cylindrical portion 52*a*. Thus, the core 52 has an L-shape in longitudinal cross section.

The seal member 53 includes a base portion 54 formed along the first cylindrical portion 52*a* and the first annular portion 52*b*, and the seal member 53 further includes a seal portion 55 and an auxiliary lip 57 formed integrally with the base portion 54. The base portion 54 is bonded to the core 52 so as to cover the outer circumferential surface of the first cylindrical portion 52*a* at the radially outer side thereof, cover the inner circumferential surface of the first cylindrical portion 52*a* at the radially inner side thereof, and cover the lower end surface of the first cylindrical portion 52*a* and the lower end surface of the first annular portion 52*b* at the first space A side. The seal portion 55 is formed integrally with the base portion 54 and is positioned below the inner circumferential edge of the first annular portion 52*b*. The auxiliary lip 57 is formed integrally with the base portion 54 and is positioned above the inner circumferential edge of the first annular portion 52*b*.

Specifically, the base portion 54 includes a second cylindrical portion 54*a* covering the inner circumferential surface of the first cylindrical portion 52*a*, a second annular portion 54*b* covering the lower end surface of the first annular portion 52*b*, a third cylindrical portion 54*c* covering the outer circumferential surface of the first cylindrical portion 52*a*, and a third annular portion 54*d* covering the lower end surface of the first cylindrical portion 52*a*. The space enclosed by the second cylindrical portion 54*a*, the second annular portion 54*b*, and the seal portion is an annular recess (space) 59 that is open downward. The core 52 is press-fitted into the through hole 21 with a medium of the third cylindrical portion 54*c* of the base portion 54. The sealing device 51A is thus fixed in the through hole 21.

The auxiliary lip 57 extends toward the second space V from the inner circumferential edge of the first annular portion 52*b* of the core 52 and extends radially inward in the direction toward the second space V. The auxiliary lip 57 is in contact with the outer circumferential surface 30S of the connection member 32 included in the rotating member 30 so as to maintain the sealing.

The seal portion 55 has an annular shape encircling the outer circumferential surface 30S of the connection member 32 included in the rotating member 30 at the radially outer side thereof, and the seal portion 55 also extends toward the first space A from the inner circumferential edge of the first annular portion 52*b* of the core 52. The seal portion 55 includes, in the inner circumferential surface thereof, a main lip 510 that is in contact with the outer circumferential surface 30S of the connection member 32 so as to maintain the sealing. The seal portion 55 further includes a first sloping surface 511 and a second sloping surface 512. The first sloping surface 511 has an annular shape extending from the main lip 510 radially outward in the direction toward the second space V, and the second sloping surface 512 has an annular shape extending from the main lip 510 radially outward in the direction toward the first space A.

Thus, the main lip 510 has a protruding shape in longitudinal section with the first sloping surfaces 511 and the second sloping surface 512.

A garter spring 58 is attached to the outer circumferential surface of the seal portion 55. The garter spring 58 squeezes the seal portion 55 radially inward to press the seal portion 55 against the outer circumferential surface 30S of the connection member 32. This enhances the sealing performance between the seal portion 55 and the outer circumferential surface 30S of the connection member 32. The seal portion 55 slidably contacts with the outer circumferential surface 30S of the connection member 32 to prevent the pressure in the first space A from leaking into the second space V through the annular space T between the rotating member and the through hole 21. The seal portion 55 thus seals between the first space A and the second space V.

The seal portion 55 is formed so that the inner diameter of the main lip 510 is smaller than the outer diameter of the connection member 32 before the rotating member 30 is assembled (free state). Therefore, when the rotating member 30 is inserted for assembly, the seal portion 55 is elastically deformed so that the diameter of the main lip 510 expands slightly. Thus, the main lip 510 slidably contacts with the outer circumferential surface 30S of the connection member 32 of the rotating member 30 while being moderately pressed against the outer circumferential surface by its own elastic restoring deformation (see FIG. 5).

The sealing device 51B has the same configuration as the sealing device 51A described above. The sealing device 51B is positioned lower than (on the first space A side of) the sealing device 51A, with the first annular portion 52b of the core 52 in contact from below with the third annular portion 54d of the base portion 54 of the sealing device 51A. The space enclosed by the recess 59 formed by the sealing device 51A, the first annular portion 52b of the sealing device 51B, and the outer circumferential surface 30S of the connection member 32 is an annular space Q1.

The space Q1 retains a lubricant (not shown). The lubricant is, for example, a highly viscous lubricant, or preferably grease. The lubricant is supplied to the slidably contacting surfaces of the main lip 510 of the sealing device 51A and the outer circumferential surface 30S of the connection member 32. This improves the lubricity of the slidably contacting surfaces and prevents wear of the slidably contacting surfaces. As a result, the sealing performance of the sealing device 51A is maintained for a long period of time.

Figure 6:
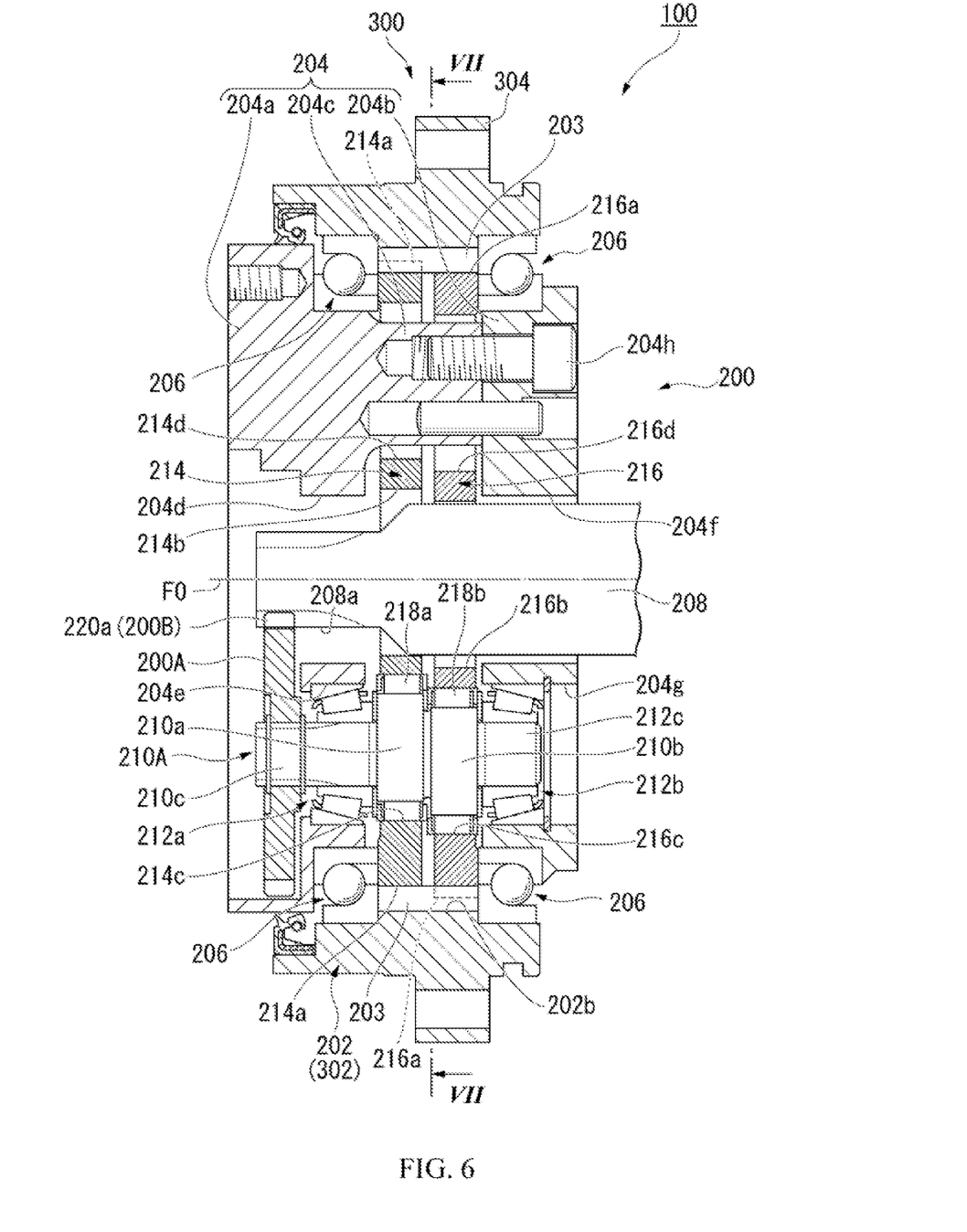
FIG. 6 is a sectional view of the rotation input unit shown in FIG. 1.
Figure 7:
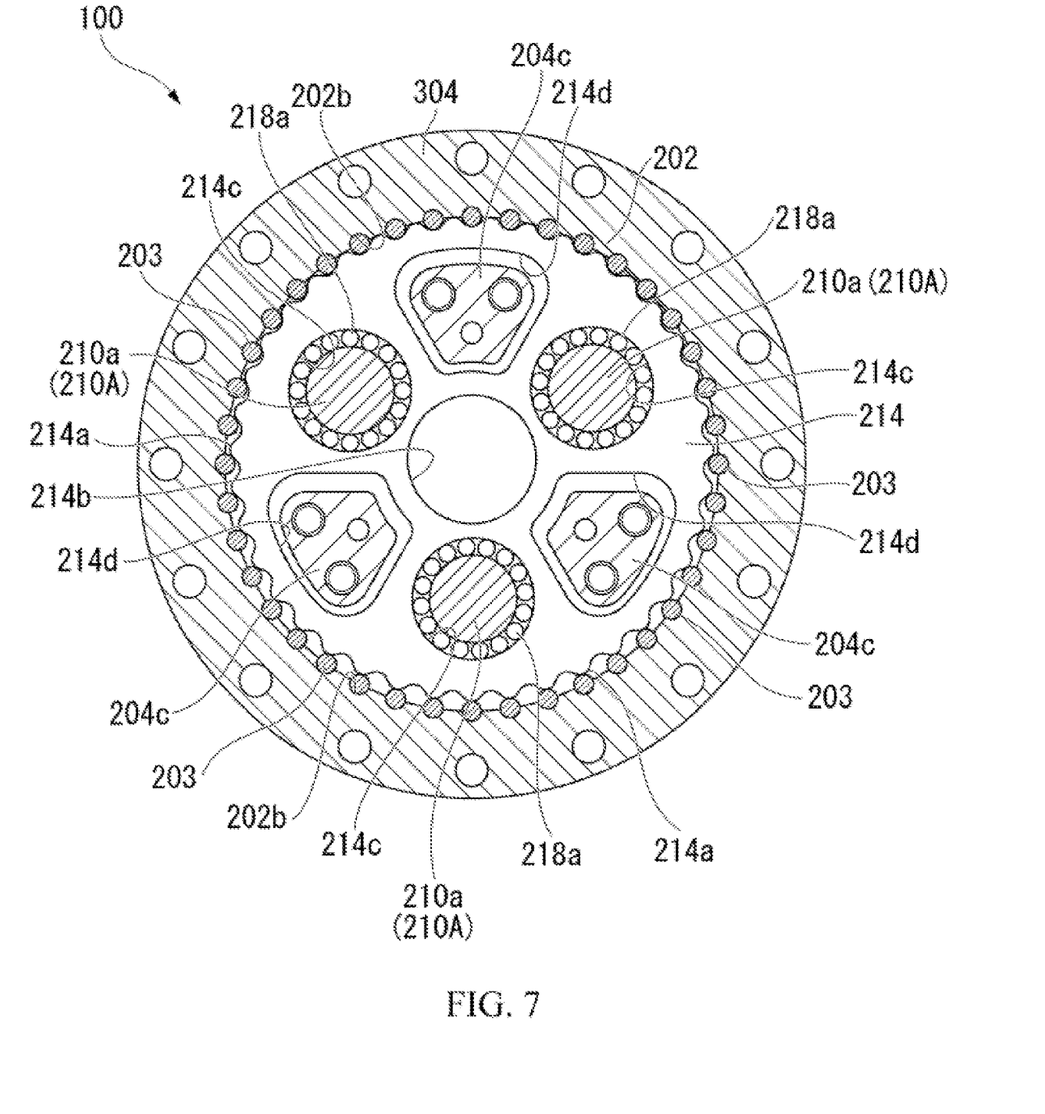
FIG. 7 is a sectional view of the rotation input unit along the line VII-VII shown in FIG. 6.

FIG. 6 is a schematic sectional view of the rotation input unit (speed reducer) 100 in this embodiment. FIG. 7 shows a sectional view of the rotation input unit 100 along the VII-VII line in FIG. 6. As shown in FIGS. 6 and 7, the rotation input unit 100 is an eccentric oscillation speed reducer. The rotation input unit 100 includes a case 300 and a reduction mechanism portion 200.

The case 300 includes a body portion 302 and a case flange portion 304. The case flange portion 304 is formed to extend radially outward from the body portion 302 and is connected to the seal partition wall 20. The direction along the rotation axis F0 of the rotation input unit 100 may simply be referred to as the axial direction. Furthermore, the input side of the rotation input unit 100 is the side where a drive source (not shown) is connected to the rotation input unit 100, and this side corresponds to the first space A side. The output side of the rotation input unit 100 corresponds to the second space V side. The rotation input unit 100 is configured to transmit a driving force while changing the number of rotations at a predetermined ratio between the drive source and the rotating member 30.

The body portion 302 (one example of a first tube) is shaped like a tube extending along the rotation axis F0. The body portion 302 is open toward the output side. The reduction mechanism portion 200 is rotatably housed in the opening of the body portion 302. The rotation input unit 100 has a plurality of (for example, three) transmission gears 200A and input gears 200B, and these gears are exposed on the output side of the rotation input unit 100.

In the rotation input unit 100, a plurality of crankshafts 210A can be rotated by rotating the input shaft 208 corresponding to the input gears 200B. In conjunction with eccentric portions 210a and 210b of the plurality of crankshafts 210A, the oscillating gears 214 and 216 are oscillatorily rotated. In this way, the input rotation is decelerated to output the decelerated rotation.

The rotation input unit 100 includes an outer tube 202 corresponding to the body portion 302, a carrier 204, which is an example of a second tube, the input shaft 208, a plurality of (for example, three) crankshafts 210A, a first oscillating gear 214, a second oscillating gear 216, and the plurality of (for example, three) transmission gears 200A.

The outer tube 202 forms the outer surface of the rotation input unit 100. The outer tube 202 has a plurality of pin grooves 202b formed in the inner circumferential surface thereof. Each pin groove 202b extends in the axial direction of the outer tube 202 and has a semicircular cross-sectional shape along the plane orthogonal to the axial direction. The plurality of pin grooves 202b are arranged at even intervals in the circumferential direction along the inner circumferential surface of the outer tube 202.

The outer tube 202 has a plurality of internal tooth pins 203. The internal tooth pins 203 are attached in the pin grooves 220b. More specifically, the internal tooth pins 203 are fitted in the corresponding pin grooves 202b and retained therein such that they extend in the axial direction of the outer tube 202. In this manner, the plurality of internal tooth pins 203 are arranged at regular intervals along the circumference of the outer tube 202. The plurality of internal tooth pins 203 mesh with first external teeth 214a of the first oscillating gear 214 and second external teeth 216a of the second oscillating gear 216.

The carrier 204 is aligned coaxially with the outer tube 202 and is housed within the outer tube 202. The carrier 204 is rotatable relative to the outer tube 202 (case 300) about the rotation axis F0. More specifically, the carrier 204, positioned radially inside the outer tube 202, is supported via a pair of main bearings 206 spaced apart from each other in the axial direction, such that the carrier 204 is rotatable relative to the outer tube 202.

The carrier 204 includes a base portion and an end plate 204b. The base portion includes a base plate 204a and a plurality of (for example, three) shaft portions 204c.

The base plate 204a is disposed on the output side within the outer tube 202. The base plate 204a has a circular through hole 204d at the center thereof. Further, the base plate 204a has a plurality of (for example, three) crankshaft mounting holes 204e (hereinafter referred to simply as "mounting holes 204e"). The plurality of mounting holes 204e are arranged around the through hole 204d at regular intervals in the circumferential direction.

The end plate 204b is spaced apart from the base plate 204a in the axial direction. The end plate 204b is thus disposed on the input side within the outer tube 202. The end plate 204b has a through hole 204f at the center thereof. Further, the end plate 204b has a plurality of (for example, three) crankshaft mounting holes 204g (hereinafter referred to simply as "mounting holes 204g"). The plurality of mounting holes 204g are arranged around the through hole 204f at regular intervals in the circumferential direction. Further, the plurality of mounting holes 204g are positioned to be opposed to the mounting holes 204e in the axial direction. Inside the outer tube 202, a closed space is defined by the opposed surfaces of the end plate 204b and the base plate 204a and the inner circumferential surface of the outer tube 202.

The three shaft portions 204c are integrated with the base plate 204a and extend linearly along the axial direction from the base plate 204a toward the end plate 204b. The three shaft portions 204c are arranged at regular intervals in the circumferential direction (see FIG. 7). The shaft portions 204c are fastened to the end plate 204b with bolts 204h (see FIG. 6). In this manner, the shaft portions 204c formed on the base plate 204a and the end plate 204b together constitute a single integral piece.

The input shaft 208 serves as an input part for receiving a driving force input thereto from a driving motor (not shown). The input shaft 208 is inserted into the through hole 204f in the end plate 204b and the through hole 204d in the base plate 204a. The input shaft 208 is arranged coaxially with the rotation axis F0 and configured to rotate about the rotation axis F0. An input gear 208a is provided on the outer circumferential surface of the end of the input shaft 208.

In the outer tube 202, the three crankshafts 210A are arranged at regular intervals around the input shaft 208 (see FIG. 7). Each of the crankshafts 210A is supported by a pair of crank bearings 212a and 212b so as to be rotatable about an axis relative to the carrier 204 (see FIG. 6). The first crank bearing 212a is located at a predetermined distance from the end of the crankshaft 210A on the output side toward the input side. The first crank bearing 212a is mounted in the corresponding mounting hole 204e formed in the base plate 204a. The second crank bearing 212b is located near the end of the crankshaft 210A on the input side. The second crank bearing 212b is mounted in the corresponding mounting hole 204g formed in the end plate 204b. In this manner, each of the crankshafts 210A is rotatably supported by the base plate 204a and the end plate 204b via the crank bearings 212a and 212b.

Each crankshaft 210A has a shaft body 212c and eccentric portions 210a and 210b integrated with the shaft body 212c. The first and second eccentric portions 210a and 210b are provided on the shaft body 212c next to each other in the axial direction between the crank bearings 212a and 212b. The first and second eccentric portions 210a and 210b have a columnar shape and project radially outward from the shaft body 212c as they are arranged eccentrically to the shaft body 212c. The first and second eccentric portions 210a and 210b are arranged with predetermined eccentricities relative to the shaft body 212c and have a phase difference of a predetermined angle from each other.

The end of each crankshaft 210A on the output side has a mating portion 210c to which the transmission gear 200A is mounted. The mating portion 210c of the crankshaft 210A is positioned on the axially outer side of the mounting holes 204e formed in the base plate 204a.

The rotation input unit 100 relating to the present embodiment is not limited to the example case shown in FIGS. 6 and 7. For example, in the rotation input unit 100, the crankshafts 210A may be oriented oppositely in the axial direction. In this case, the mating portions 210c may be arranged outside the mounting holes 204g in the axial direction (this configuration is referred to as opposite arrangement).

The first oscillating gear 214 is located in the closed space within the outer tube 202 and is attached to the first eccentric portion 210a of each crankshaft 210A via a first roller bearing 218a. As each crankshaft 210A rotates, the first eccentric portion 210a eccentrically rotates. The eccentric rotation results in the first oscillating gear 214 oscillatorily rotating while meshing with the internal tooth pins 203.

The outer diameter of the first oscillating gear 214 is slightly smaller than the inner diameter of the outer tube 202. The first oscillating gear 214 has first external teeth 214a, a central through hole 214b, a plurality of (for example, three) first eccentric portion insertion holes 214c, and a plurality of (for example, three) shaft portion insertion holes 214d. The first external teeth 214a are shaped like smooth and continuous waves along the entire circumference of the oscillating gear 214.

The central through hole 214b is formed at the center of the first oscillating gear 214. The central through hole 214b receives therein the input shaft 208 with a clearance therebetween.

The three first eccentric portion insertion holes 214c are arranged at regular intervals in the circumferential direction around the central through hole 214b. The first eccentric portions 210a of the crankshafts 210A are inserted in the first eccentric portion insertion holes 214c, via the first rolling bearings 218a interposed therebetween.

The three shaft portion insertion holes 214d are arranged at regular intervals in the circumferential direction around the central through hole 214b. The shaft portion insertion holes 214d are positioned between the first eccentric portion insertion holes 214c next to each other in the circumferential direction. The shaft portion insertion holes 214d receive therein the corresponding shaft portions 204c with a clearance therebetween.

The second oscillating gear 216 is located in the closed space within the outer tube 202 and is attached to the second eccentric portion 210b of each crankshaft 210A via a second roller bearing 218b. The first and second oscillating gears 214 and 216 are next to each other in the axial direction correspondingly to the first and second eccentric portions 210a and 210b. As each crankshaft 210A rotates, the second eccentric portion 210b eccentrically rotates. The eccentric rotation results in the second oscillating gear 216 oscillatorily rotating while meshing with the internal tooth pins 203.

The outer diameter of the second oscillating gear 216 is slightly smaller than the inner diameter of the outer tube 202. The second oscillating gear 216 is configured in the same manner as the first oscillating gear 214. Specifically, the second oscillating gear 216 has second external teeth 216a, a central through hole 216b, a plurality of (for example, three) second eccentric portion insertion holes 216c, and a plurality of (for example, three) shaft portion insertion holes 216d. These are designed in the same manner as the first external teeth 214a, the central through hole 214b, the first eccentric portion insertion holes 214c, and the shaft portion insertion holes 214d of the first oscillating gear 214. The second eccentric portions 210b of the crankshafts 210A are inserted in the second eccentric portion insertion holes 216c, via the second rolling bearings 218b interposed therebetween.

Each transmission gear 200A transmits the rotation of the input gear 208a to the corresponding one of the crankshafts 210A. Each transmission gear 200A is fitted onto the mating portion 210c of the corresponding crankshaft 210A. Each transmission gear 200A is rotatable integrally with the corresponding crankshaft 210A around the same axis as the corresponding crankshaft 210A. Each transmission gear 200A has external teeth 220a meshing with the input gear 208a. The external teeth 220a correspond to the input gear 200B.

The rotation input unit 100 described above is a gear device configured to transmit a driving force while changing the number of rotations at a predetermined ratio between the drive source (first member) and the rotating member 30 (second member). The rotation input unit 100 includes eccentric portions (210a, 210b) and oscillating gears (214, 216) having insertion holes (214c, 216c) into which the eccentric portions are inserted and also having teeth (214a, 216a). Furthermore, the rotation input unit 100 includes a first tube (202, 302) that can be attached to one of the first and second members, and a second tube (204) that can be attached to the other of the first and second members. The first tube (202, 302) has internal teeth (203) meshing with the teeth of the oscillating gears. The second tube is positioned inside the first tube in the radial direction while holding the oscillating gears. The first and second tubes are concentrically arranged and rotatable relative to each other when acted upon by oscillation of the oscillating gears caused by rotation of the eccentric portions in the reduction mechanism portion 200.

The rotary feedthrough 10 according to this embodiment includes the rotation input unit (speed reducer) 100, the seal mechanism 50, and the rotation restraining unit 40 that are arranged in this order along the rotation axis F0, from the first space A side, which is maintained at the atmospheric pressure, toward the second space V side, which is maintained in a vacuum. In particular, the rotation restraining unit 40 is located on the second space V side, and thus the length of the rotary feedthrough 10 along the axial direction can be small. In addition, the fixed portion 41 and the restraining portion 42 of the rotation restraining unit 40 are positioned at such levels that they overlap with each other in the direction along the rotation axis F0, thus reducing the length of the rotary feedthrough 10 along the axial direction. Furthermore, as viewed from the direction along the rotation axis F0, the rotation diameter of the restraining portion 42 in the rotation restraining unit 40 is smaller than the outer diameter (diameter) of the case 300. This reduces the size of the rotary feedthrough 10 in the radial direction for downsizing.

Furthermore, there has conventionally been a demand for installing the rotation restraining unit (mechanical stopper) 40 at a position on the second space V side (vacuum side) and as close as possible to the rotation axis F0 in the radial direction. However, in this case, the smaller radius of rotation increases the strength required for the rotation restraining unit, assuming the same rotational torque. In addition, to maintain the strength, it is necessary to increase the cross-sectional area of the contact portion in the rotation restraining unit 40, which in turn increases the sizes of the peripheral members.

In this respect, the rotary feedthrough 10 of this embodiment has the restraining surfaces 41r and 42r that increase the contact area between the fixed portion 41 and the restraining portion 42. Therefore, sufficient strength can be obtained even if the rotation restraining unit 40 is disposed on a radially inner side. Therefore, it is possible to safely restrain the rotation of the rotating member 30. Furthermore, the circumferential width of the restraining portion 42 is larger than the circumferential width 41t of the fixed portion 41, and thus the rotation of the rotating member 30 can be stopped even when an excessive load is applied during an emergency, for example.

Furthermore, the rotation restraining unit 40 serves to mechanically stop the free running of the rotating member 30 when, for example, the robot or device is electrically uncontrollable due to an unexpected power failure. In such a case, a strong impact may be applied to the rotation restraining unit 40. However, the rotation restraining unit 40 has a sufficient strength and thus can safely stop the device.

In addition, the rotation restraining unit 40 may need to be replaced to restore the device, but such replacement requires much work time and many work processes. Therefore, there is a need to replace only the rotation restraining unit 40, but this is difficult for conventional devices.

By contrast, in the rotary feedthrough 10 of this embodiment, the fixed portion 41 and the restraining portion 42 of the rotation restraining unit 40 are removable. Therefore, the time required to restore the production line can be shortened, and thus restoration can be done quickly. In particular, since the work is performed in a vacuum apparatus, it is necessary to reduce the effects of particle generation, chamber contamination, and the like. Therefore, there is a need to improve the work efficiency or reduce the number of work processes in the replacement of the rotation restraining unit 40. In this respect, with the rotary feedthrough 10 of this embodiment, it is not necessary to remove the vacuum seal (seal mechanism 50) when replacing the rotation restraining unit 40. Therefore, the number of work processes required for replacing the rotation restraining unit 40 can be reduced, and work efficiency can be improved. Furthermore, the effects of contamination and the like in the vacuum chamber can be reduced, and the time required to restore the production line can be shortened.

Second Embodiment

Figure 8:
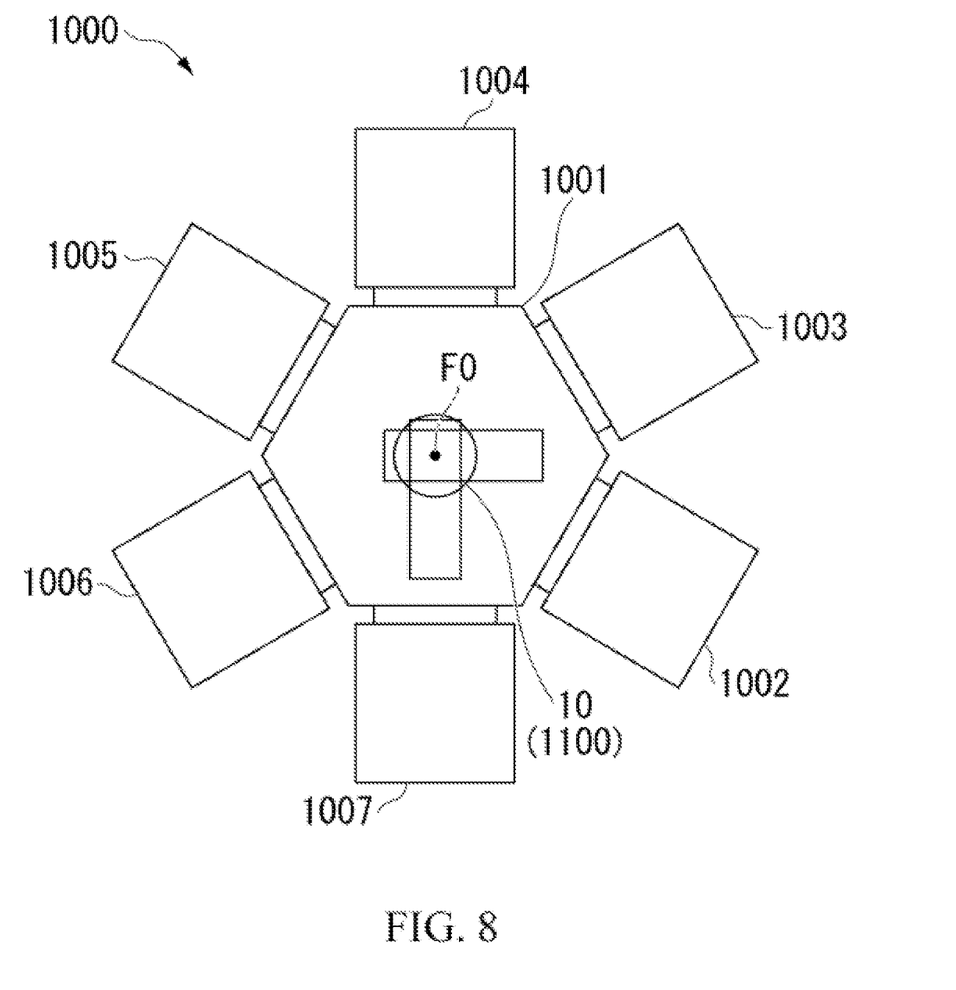
FIG. 8 is a schematic diagram of a vacuum processing apparatus having the second embodiment of the rotary feedthrough according to the present disclosure.
Figure 9:
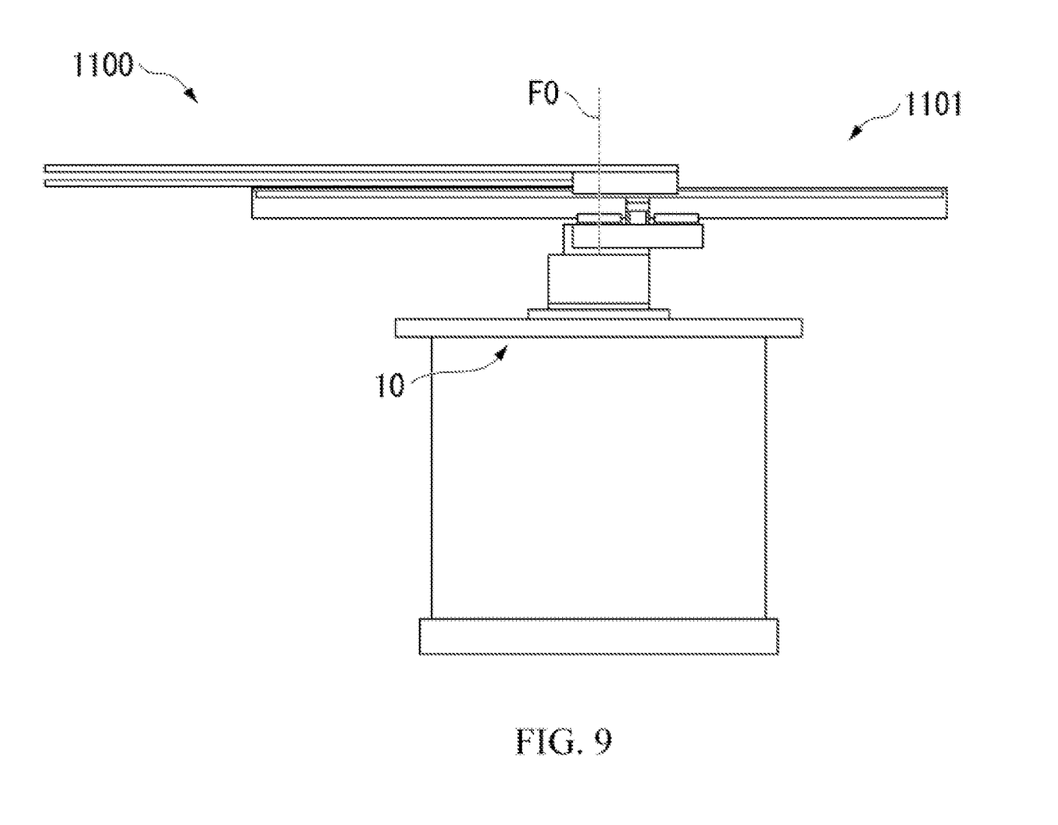
FIG. 9 is a schematic side view of the substrate transfer robot shown in FIG. 8.

A second embodiment of the rotary feedthrough according to the disclosure will be hereinafter described with reference to the accompanying drawings. FIG. 8 is a schematic plan view of a vacuum processing apparatus having a rotary feedthrough. FIG. 9 is a schematic view of a transfer robot having a rotary feedthrough. This embodiment is different from the first embodiment in terms of the location of the rotary feedthrough. Therefore, except for this difference, the same reference numerals are given to elements of the second embodiment corresponding to elements of the first embodiment, and the description of these elements will not be repeated.

As shown in FIG. 8, the rotary feedthrough 10 is incorporated into the vacuum processing apparatus 1000. The vacuum processing apparatus 1000 is used for the manufacture of FPDs, for example. The vacuum processing apparatus 1000 is capable of processing glass substrates having sides with a length of 50 mm or more, 100 mm or more, or 1000 mm or more, for example. The vacuum processing apparatus 1000 includes a transfer chamber 1001 and a plurality of chambers 1002 to 1007. The plurality of chambers 1002 to 1007 are arranged at regular intervals in the circumferential direction around the transfer chamber 1001 so as to be centered on the rotation axis F0. In the illustrated example, the vacuum processing apparatus 1000 includes six chambers 1002 to 1007, but the number of chambers is not limited to six. The plurality of chambers 1002 to 1007 can be used as processing chambers, loading chambers, or unloading chambers for a given vacuum process, as appropriate.

The rotary feedthrough 10 of this embodiment is installed in the transfer robot 1100, which is located in the transfer chamber 1001. As shown in FIG. 9, the transfer robot 1100 includes a rotary feedthrough 10 located at the bottom and a transfer unit 1101 located at the top and configured to transfer substrates (not shown). The rotary feedthrough 10 rotationally drives the transfer unit 1101 about the rotation axis F0 in the transfer chamber 1001.

By applying the rotary feedthrough 10 to the substrate transfer robot 1100, the axial (vertical) dimension of the rotary feedthrough 10 in the first space A is reduced to about one-third of that of the conventional feedthrough. Therefore, in this embodiment, the vacuum processing apparatus 1000 can be made low, and this achieves downsizing and cost reduction.

Typically, when FPD glass substrates increase in size from G6 to G8.6 or the like, the overall height of the FPD manufacturing apparatus tends to increase. As a result, the ceiling height of the building containing the manufacturing apparatus is insufficient, and measures such as constructing a new plant are necessary. This causes huge costs. In order to reduce the overall height of the FPD manufacturing apparatus, the vacuum robot located in the transfer chamber needs to be made low. The rotary feedthrough 10 of this embodiment meets such needs and solves the existing issue.

In the embodiments disclosed herein, a member formed of multiple components may be integrated into a single component, or conversely, a member formed of a single component may be divided into multiple components. Irrespective of whether or not the components are integrated, they are acceptable as long as they are configured to attain the object of the invention.

What is claimed is:

1. A rotary feedthrough comprising:
   a partition wall dividing a space into a first space and a second space;
   a rotating member positioned to extend through the partition wall and configured to transmit a rotational driving force;
   a rotation input unit positioned in the first space and configured to input a driving force to the rotating member; and
   a rotation restraining unit positioned in the second space and configured to restrain rotation of the rotating member,
   wherein the rotation restraining unit restrains rotation of the rotating member about a rotation axis exceeding a predetermined rotation angle,
   wherein the rotation restraining unit includes:
      a restraining portion provided on the rotating member and configured to rotate about the rotation axis together with the rotating member; and
      a fixed portion fixed to the partition wall and configured to be contacted by the restraining portion from a circumferential direction around the rotation axis,
   wherein the restraining portion has a first restraining surface,
   wherein the fixed portion has a second restraining surface configured to be contacted by the first restraining surface from the circumferential direction in order to restrain rotation of the rotating member,
   wherein the second restraining surface is a convex rounded surface protruding toward the first restraining surface,
   wherein the first restraining surface is a concave rounded surface conforming to the convex rounded surface,
   wherein the first restraining surface and the second restraining surfaces are shaped like an arc with the same curvature, and
   wherein a circumferential width of the restraining portion is larger than a circumferential width of the fixed portion.

2. The rotary feedthrough of claim 1,
   wherein a rotation diameter of the rotating member is smaller than an outer diameter of the rotation input unit, as viewed from a direction along the rotation axis.

3. The rotary feedthrough of claim 1,
   wherein the restraining portion and the fixed portion are formed of a tempered material that has been heat treated.

4. The rotary feedthrough of claim 1,
   wherein the restraining portion is detachably attached to the rotating member.

5. The rotary feedthrough of claim 1, wherein the partition wall has provided thereon a seal mechanism that extends between the rotating member and the partition wall to divide the space into the first space and the second space.

6. The rotary feedthrough of claim 5, wherein the seal mechanism is positioned between the rotation restraining unit and the rotation input unit in a direction along the rotation axis.

7. The rotary feedthrough of claim 1,
   wherein the rotation input unit includes:
      a case;
      an internal gear provided in the case and having internal teeth;
      an oscillating gear having external teeth meshing with the internal teeth, the oscillating gear being configured to oscillatorily rotate;
      a crankshaft having an eccentric portion that rotatably supports the oscillating gear and configured to transmit a rotational force of a drive source to the oscillating gear; and
      a carrier configured to receive the rotational force from the oscillating gear and output the rotational force as the driving force to the rotating member.

8. A robot comprising:
   the rotary feedthrough of claim 1,
   wherein partition wall is to be maintained the first space at atmospheric pressure and to be maintained the second space in a vacuum,
   wherein the rotation input unit is positioned in the first space and configured to output to the rotating member a rotational force generated by a drive source as the driving force, and
   wherein the rotating member transmits the rotational driving force to the second space.

9. The robot of claim 8, wherein the second space is a vacuum space in a transfer chamber included in a vacuum processing apparatus.

* * * * *